1,938,327

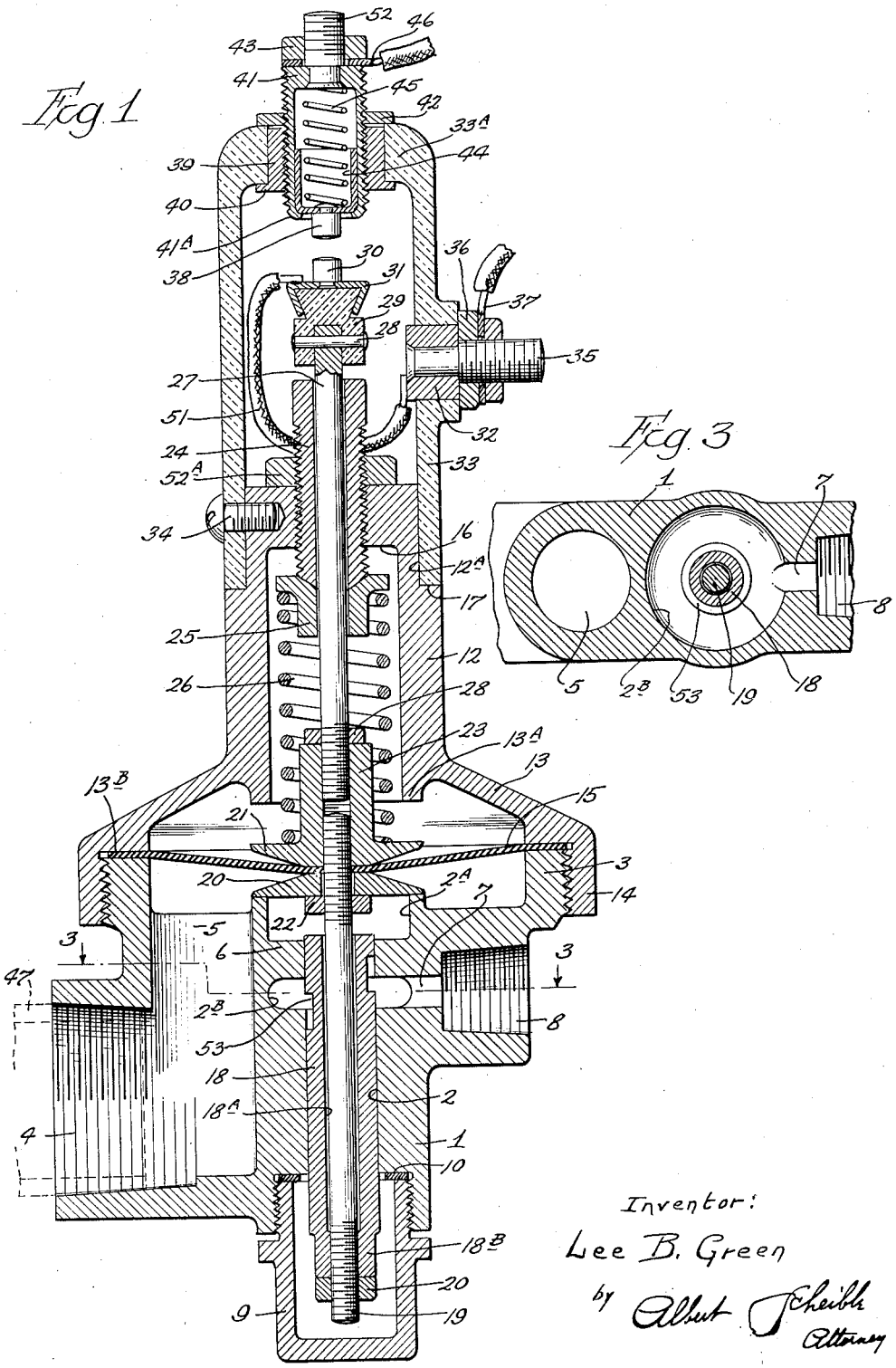

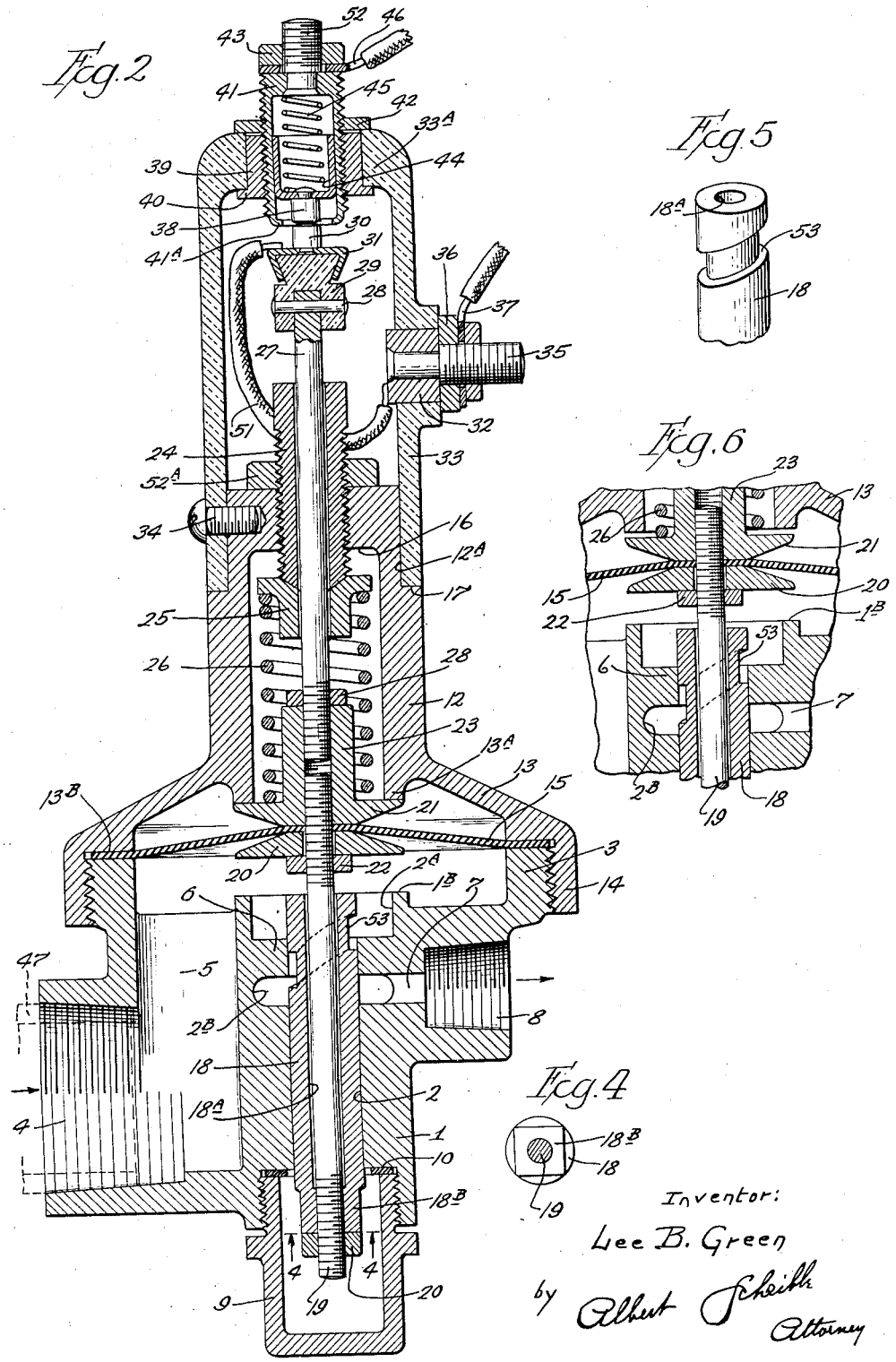
Dec. 5, 1933.    L. B. GREEN    1,938,327
COMBINED PRESSURE REGULATOR AND SWITCH
Filed Sept. 14, 1932    2 Sheets-Sheet 2
Inventor:
Lee B. Green
by Albert Scheith
Attorney Patented Dec. 5, 1933

UNITED STATES PATENT OFFICE 1,938,327

COMBINED PRESSURE REGULATOR AND SWITCH

Lee B. Green, Lakewood, Ohio, assignor to The Globe Machine & Stamping Company, Cleveland, Ohio, a corporation of Ohio Application September 14, 1932
Serial No. 633,099

12 Claims. (Cl. 137—111)

My invention relates to a combined fluid valve and switch, its general objects being those of providing means responsive to fluid pressure for conjointly controlling both the flow of fluid and the flow of electric current, and for metering the flow of the fluid according to variations in the pressure at which the fluid is supplied.

In my copending application #600,877 entitled "Water heater for coffee making" I have disclosed an appliance for electrically heating water supplied from a water pipe connection, including automatic means for closing the circuit to the heating member and opening a valve for the water whenever the store of hot water within the appliance is less than a given quantity. With the arrangement there disclosed, the valve is always opened to a predetermined extent, it being assumed that the supply of water would always be at a substantially constant pressure so as to cause cold liquid to flow within the appliance at the rate to which the wattage of the electric heating member is proportioned.

However, the water pressure available in most cities varies considerably, particularly during the summer months, so that the water will frequently flow through the fully opened valve at a rate out of proportion to the wattage of the heating member, thereby causing either an insufficient or an excessive heating of the water. Moreover, if the supply of water through the water pipe is accidentally or inadvertently shut off while the supply of current is continued, the water in which the heating member is immersed will soon be boiled off, leaving the heating member exposed to the air and likely to be damaged by overheating.

My present invention aims to guard against the just recited occurrences by providing a control device which will automatically meter the flow of water in proportion to the water pressure, which will close the electric circuit only when this water pressure exceeds a predetermined minimum, and which will automatically open this circuit when the supply of water to the water pipe is interrupted or is at too low a pressure to limit the temperature of the heated water to approximately the desired temperature. Moreover, my invention aims to provide a combined electric switch and liquid valve which will automatically adjust the effective opening of the valve to compensate in variations in the liquid pressure when the valve is open, without interrupting the circuit connection.

My invention also aims to provide a combined liquid metering valve and electric switch which can easily be manufactured in an inexpensive and compact form, which can easily be assembled and disassembled, and to which both the water and circuit connections can easily be made. Furthermore, my invention aims to provide a combined liquid valve and switch which will permit an independent adjusting of the valve and of the electric switch, which will allow the effective maximum opening of the valve to be adjusted from the exterior of the appliance without disassembling the latter.

In addition, my invention aims to provide an appliance for these plural purposes in which the electric switch is effectively sealed against liquid and liquid vapor and in which almost all parts can consist of moulded portions and of screw machine products.

Illustrative of my invention and of further objects of the same,

Fig. 1 is a central and vertical section through a hydrostatically actuated valve and switch embodying my invention, the section being taken along the axes of both the liquid inlet and the liquid outlet, showing the movable parts as they appear when no liquid under pressure is being supplied.

Fig. 2 is a section similar to Fig. 1, taken when the diaphragm has been flexed upwardly to the maximum permissible extent so as to open the valve and close the electric circuit.

Fig. 3 is a fragmentary horizontal section taken along the line 3—3 of Fig. 1.

Fig. 4 is a fragmentary section taken along the line 4—4 of Fig. 2, looking upward.

Fig. 5 is a perspective view of the upper portion of the metering plunger of the valve.

Fig. 6 is a section similar to portions of Figs. 1 and 2, showing the metering valve in the position in which it affords a maximum effective opening for the flow of liquid through it.

In general, I accomplish the purposes of my invention in the following manner:

(1) I provide a hollow casing through which the liquid passes from an inlet to an outlet, a closure valve element disposed for intercepting the said passage of liquid, an electric switch shielded from the liquid, means responsive to the pressure of liquid within the casing for moving the said valve element out of its closure position and conjointly therewith closing the switch, and means for returning the said element to its closure position and conjointly therewith opening the switch when there is no adequate liquid pressure in the casing.

(2) I provide means for metering the rate of flow of the liquid when the closure valve element is out of its closure position, so as to increase this rate of flow during the initial movement of the said valve element away from its closure position.

(3) I provide an electric switch so connected to the said closure element and metering means and arranged that this switch will be closed approximately at the end of the said initial movement (or when the metered rate of flow reaches its maximum) and held closed during a continued movement of the closure element and metering means in the same direction.

(4) I arrange the metering means so as to decrease the rate of liquid flow progressively during the said continued movement of the closure element and the metering means.

(5) I provide means for positively halting the said movement in the said direction when the said decreasing of the rate of liquid flow has reached a predetermined point.

(6) I provide independently variable means for adjusting the connections of the pressure—responsive means to the switch, the closure member and the metering means.

(7) I employ the pressure responsive means also for partitioning the interior of the casing to prevent liquid and even liquid vapor from reaching the electric switch.

In the illustrated embodiment, the casing of my combined liquid controlling and metering valve and electric switch, when this appliance is upright as in Figs. 1 and 2, includes a body 1 having an upright bore 2 extending through it and leading to a cup-shaped upper body part 3, the upper end portion 2A of the said bore being enlarged in diameter to form an upwardly open recess. This body is provided with an inlet passage leading to the interior of its said cup-shaped upper part, which passage desirably consists of a lateral inlet bore 4 leading to an upright bore 5 which leads upwardly into the interior of the said cup-shaped part 3. The upright bore 2 also has an annular enlargement 2B spaced somewhat downwardly from the lower end of the upper end enlargement 2A to leave an annular flange 6 therebetween, and this bore enlargement 2B is connected by a passage 7 to an outlet 8, so that the said recess, the bore of the flange 6, the annular bore enlargement 2B and the passage 7 together form an outlet passage. Threaded to the lower end of the body, desirably in axial alinement with the said upright bore is a cup-like closure member 9 which is sealed to the body by interposing a gasket 10 between the upper end of this closure member and a shoulder 11 on the body.

Surmounting the body is a cover of inverted funnel shape, including a stem having a tubular medial portion 12 connected at its lower end by an annular portion 13 with a depending flange 14 threaded upon the upper part 3 of the body. This cover alines axially with the upright bore in the body and presents an annular horizontal shoulder 13B above the said upper body part 3, so that the peripheral portion of a flexible and centrally perforated diaphragm 15 can be clamped between the said shoulder and the upper end of the body. The cover has an annular top 16, and the upper part 12A of the tubular portion 12 is diametrically contracted to present an annular and upwardly facing shoulder 17.

Slidably fitting the parts of the upright body bore 2 both below and above the annular flange 6 is a tubular valve plunger 18 which extends above this flange in all operative positions of the plunger and which is formed to afford a liquid passageway from the recess afforded by the upper bore enlargement 2A to the annular passage 2B which is connected to the outlet 8. As here shown, this liquid passageway is afforded by a peripheral groove 53 milled in the plunger oblique to the axis of the plunger, the width of this groove desirably being approximately equal to the thickness of the said flange 6.

Extending through and beyond both ends of the tubular plunger is a valve stem 19 which is threaded through the lower end of the plunger, the bore 18A of the plunger desirably being somewhat larger in diameter than the said stem so that the stem can flex slightly in case the assembled parts are not in exact alinement. The upper portion of the valve stem extends freely both through the bore of a washer 20 and through the axial bore of the diaphragm 15, and this stem has its upper end threaded into the lower portion of a presser member which includes a head 21 engaging the top of the diaphragm. This head and the washer 20 preferably present convexed faces toward each other, and the said washer is clamped against the lower face of the diaphragm by a nut 22 threaded upon the valve stem 19, so as to suspend this stem together with the valve plunger from the diaphragm.

The presser member also includes a tubular shank 23 rising from its head 21; and the radially outer portion of this head has a horizontal upper face disposed for engaging an annular stop 13A depending from the cover part 13 adjacent to the bore of the tubular cover part 13, so as to limit the raising of the valve stem and plunger by an upward flexing of the diaphragm.

Threaded through the top 16 of the cover, coaxial with the valve stem 19 and the diaphragm, is a tubular screw 24 which has its downwardly tapering end engaging the top of a thrust member 25 freely housed by the tubular portion 12 of the cover. Interposed between this thrust member and the presser member 21 is a compression spring 26 which is approximately centered by portions of these two members which are housed by the spring. This spring continuously tends to flex the diaphragm downwardly so as to seat the washer 20 on the body member to close the enlarged upper end 26A of the upright bore in that member.

Extending through both the tubular screw 24 and the thrust member 25 and guided by the said screw, is an upper stem 27 which is threaded at its lower end into the tubular shank 23 of the presser member and locked against unscrewing by a nut 28 engaging the top of the shank, with sufficient clearance between the adjacent ends of the two stems 19 and 27 to permit each of these stems to be adjusted as to the distance to which it extends into the said shank.

Fastened to the upper end of the upper stem 27, as by a pin 28, is an insulator 29 supporting a contact member 30 in axial alinement with the said two stems and the diaphragm. As here shown, this contact member is a metal post clinched to the top of a metal cup 31 which has its riser side spun over the upper end of the insulator. Soldered at one end to this cup is a flexible conductor 51 which has its other end soldered to a sleeve 32 socketed in a lateral bore in a dome or cap of insulating material which freely houses the said contact member and conductor.

This cap has its lower portion telescoped over the diametrically contracted upper part 12A of the cover of the body and seated on the annular shoulder 17, and the cap is normally secured to the said cover by a screw 34. Clinched to the metal sleeve 32 is a terminal screw 35 which is clamped to the said cap by an exterior nut 36, while a still more outward nut (also threaded on this terminal screw) clamps a circuit terminal 37 against the inner nut 36.

The companion contact member 38 is disposed above the contact member 30 which the diaphragm supports through the previously described stem assembly, and is also coaxial with the said stems, but is yieldingly supported for vertical movement. For that purpose, the upper end 33A of the cap 33 has an axial bore housing the shank of a sleeve 39 which has a radial flange 40 engaging the lower face of this cap end, and an upright hollow metal guide 41 is threaded through this sleeve and locked to it by an exterior nut 42 which also clamps the sleeve flange 40 against the dome. Clinched to the upper end of the metal guide 41 is a second terminal screw 52 disposed so that the companion circuit terminal 46 can be clamped against the top of the metal guide by a nut 43. Slidable in the metal guide is a metal cup 44 to which the said companion contact member 38 is fastened. This slidable cup is continually urged downwardly by a spring 45 interposed between the bottom of the cup and the top of the guide 41, and the lower end of this hollow guide has an inwardly directed flange 41A disposed for engaging the contact-carrying cup to limit the downward sliding of that cup.

When using my thus constructed appliance for controlling the supply of both cold liquid and electric current to an electric liquid heater, a liquid supply pipe 47 (shown in dotted lines in Fig. 2) is connected to the body inlet 4, the outlet 8 is connected to a liquid duct leading to the heater, and a supply of current is connected to the circuit terminals 37 and 46. With such connections, the operation is as follows:

When the supply of liquid through the pipe 47 is shut off or is at a pressure below that for which the spring 26 is adjusted, this spring flexes the diaphragm downwardly (as in Fig. 1) so that the washer 20 closes the upper end of the upright body bore 2, or the entrance end of the outlet passage. With the valve plunger suitably adjusted as to its spacing from the said washer, which washer has the double function of a diaphragm-clamping member and a closure member, the upper part of the groove 53 in the valve plunger 18 is entirely housed by a part of the cylindrical bore in which this plunger slides, thereby affording a second seal against leakage of liquid from the inlet to the outlet.

As soon as liquid under suitable pressure is admitted through the inlet, the upward pressure of liquid on the diaphragm will raise the diaphragm; and as soon as a part of the upper wall of the obliquely disposed plunger groove 53 is disposed at higher elevation than the washer seat 1B at the upper end of the axial upright bore in the body, liquid will flow through this groove into the annular passage 2B and from the latter through the bore 7 and the outlet 8 to the heater. As the liquid pressure increases, the upper end of the groove in the plunger will be correspondingly raised, thereby increasing the effective area of the liquid passage around the plunger until the plunger is in its midheight position of Fig. 6 in which the groove presents effective cross-sections of equal area both above and below the annular flange 6, so as to permit liquid to flow past the valve at the rate for which the heating member of the liquid heater is designed.

However, if the liquid pressure becomes still greater, the resulting further lifting of the diaphragm and the valve plunger will thereafter decrease the area of the opening at the lower end of the groove, thereby reducing the flow past the valve with an excess of pressure; so that the valve automatically meters the rate of flow in proportion to the pressure. And with an unduly high pressure, the diaphragm will flex upwardly until the pressure member 21 engages the stop element 13A on the cover, thereby halting the lifting. With the diaphragm thus halted in a raised position, the position of the plunger can readily be adjusted (by detaching the bottom closure 9, loosening the nut 20 and turning the plunger in either rotational direction) until the desired rate of liquid flow is obtained, this adjusting being expedited by making the lower end 18B of the plunger of a polygonal section (as shown in Fig. 4) and having the stem 19 and the nut 20 extend below the lower end of the body even when the diaphragm is flexed upwards to its maximum.

To afford the corresponding circuit control, the upper stem is adjusted so that with the diaphragm flexed downward by the spring in the valve-closing position of Fig. 1, the contact members 30 and 38 are spaced from each other by a distance about one-half the extent of vertical movement permitted to the plunger by the heretofore described stop provisions. Then when the plunger and stem assembly is raised to an extent even less than that shown in Fig. 6, the contact members will engage to close the circuit, and the yieldable mounting of the upper contact member will allow this member to raise to a correspondingly greater extent while holding the circuit closed. However, the engagement of the presser element 21 with the shoulder 13A on the cover part limits this raising of the yieldingly supported contact 38 so as not to overstrain the spring associated with it.

Whenever the supply of liquid to the inlet is discontinued, or the pressure of the liquid falls to an undue extent (such as would cause this liquid, when admitted at a slow rate to a liquid heater to be vaporized too quickly, thereby quite possibly burning out the heating element of that heater), the pressure of the spring 26 flexes the diaphragm downwardly so as to separate the two contacts and to shut off the supply of current. During the manufacture, any needed adjustment as to the distance of the stem-supported contact member from the diaphragm (and hence from the stop washer 20) can readily be made before the dome 33 and the parts carried by this dome are attached to the cover 12, as the flexibility of the conductor 51 will readily permit the assembly. By making this conductor of a suitable length and also limiting the distance to which the cap 33 extends downwardly alongside the cover, the cap and the parts supported by it can also be detached at any time (without unsoldering the ends of the flexible conductor), thereby affording access to the contacts, permitting a readjustment of the stem 27, or also permitting an adjusting of the height at which the tubular stem-guiding screw 24 is locked by a latch-nut 52A.

In the assembled appliance, the cup-like upper end portion 3 of the body and the annular part 13 of the cover cooperate in forming a chamber across which the diaphragm extends and the diaphragm prevents the entrance moisture (or even liquid vapor) from entering the upper part of this chamber and from reaching the electric switch portion of my appliance. By using a dome or cap of insulating material, I also am able to secure adequate insulation while only employing a single additional member of insulating material.

The other casing parts, namely the body 1, the cover and the bottom closure 9 can all be of metal, with both the body and this bottom closure of a metal not likely to be corroded by the liquid which is to flow through the valve. Moreover, my construction lends itself to compactness, having proven to be easily manufactured and assembled (in the form here pictured) with a total height of less than six inches.

However, while I have heretofore described my invention in connection with an embodiment including numerous desirable details of construction and arrangement, I do not wish to be limited in these respects, as many changes might be made without departing either from the spirit of my invention or from the appended claims. Nor do I wish to be limited to the use of my appliance in the upright position in which it has been described, as it will function equally well regardless of its position.

Moreover, it will be obvious that the operation of my appliance would be the same, regardless of the nature of the liquid (or other fluid) which is supplied to it, or the purposes in connection with which a supply of fluid and a supply of current are to be conjointly controlled. Hence it is to be understood that the describing of my invention as employed for controlling an electrically actuated water heater is only by way of illustration, based on the operation of my appliance for one of its immediate commercial purposes.

When used for this particular purpose, namely in connection with an electric coffee water heater designed for lunch room use, experience with my here presented control appliance has demonstrated its decided advantage over the heretofore customary use of electric liquid heaters which (if not of a type requiring manual attention for replenishing the liquid) require a separate control of the current supply and of the liquid supply. With my combination control device, no manual control of the electric current is needed, as a shutting off of the water supply at the end of the day automatically opens the switch. So also, if the water supply should be interrupted at any time during the day, the supply of current is automatically discontinued, and whenever the water supply is resumed, the current is automatically restarted. And at the start of the next day, a mere opening of the hand valve controlling the supply of water to my appliance suffices for affording both the electric current connection and the metering of the water to the device with which this appliance is associated.

Moreover, since the supply of water to the valve-controlled passage is automatically shut off whenever the supply of water under pressure to the inlet is discontinued, there is no risk of leakage of residual liquid from the appliance. Indeed, with the double seal afforded by the upper end of the plunger 18 and the closure washer 20, my control appliance can be disconnected from the liquid heater or other device associated with it, without having any further discharge of liquid from it.

I claim as my invention:

1. A combined fluid valve and electric switch comprising a body having an interior chamber and a fluid inlet leading to the said chamber, the body also having an outlet passage leading from the said chamber; an electric switch; a metering valve member associated with the said passage and movable with respect to the said body for varying the effective area of this passage; and spring-resisted means responsive to fluid pressure for moving the valve member away in one direction and closing the switch; and means operatively connecting the switch with the said valve member; the connecting means being arranged so that during a continuous movement of the valve member in the said direction the valve member progressively increases the said effective area before the switch is closed and thereafter decreases the said area, and so that the switch is kept closed during the said decreasing.

2. In a combined fluid-flow control valve and electric switch, a body comprising relatively detachable upper and lower body parts formed for conjointly affording a chamber within the said body, the lower body part having an inlet passage leading to the said chamber and having an outlet passage presenting an upwardly facing entrance opening; a cap surmounting and secured to the upper body part and extending above the top of the upper body part to afford an air chamber above the said top; an electric switch including two relatively movable members disposed within the air chamber; a metering valve member movably disposed in the outlet passage; a diaphragm extending across the said chamber above both of the said passages and clamped at its edge between the two body parts and adapted to be flexed upwardly by fluid pressure, and means rigidly connecting the diaphragm with the valve member and a member of the switch.

3. A device for controlling a supply of both liquid and of current, comprising a liquid valve having a valve member movable in one direction to a position in which it shuts off the flow of liquid through the valve, the valve member also having a portion thereof formed for metering the said flow of liquid in response to the extent to which the valve member is moved away from its said shut-off position, means responsive to the pressure at which liquid is admitted to the valve for raising the valve member; and an electric switch including a member responsive to movements of the valve member for closing the switch after the valve member has moved to a predetermined extent away from its said shut-off position, the switch including a contact which is yieldingly mounted to permit a further movement of the said switch member in the last named direction.

4. In a combined fluid-flow control valve and electric switch, a body comprising relatively detachable upper and lower body parts formed for conjointly affording a chamber within the said body, the lower body part having an inlet passage leading to the said chamber and having an outlet passage presenting an upwardly facing entrance opening to the said chamber; a cap surmounting and secured to the upper body part and extending above the top of the upper body part to afford an air chamber above the said top; and an electric switch within the cap, a movable valve member controlling the entrance opening to the outlet passage, and spring-resisted means responsive to fluid pressure within the chamber for moving the valve member in a valve-opening direction and thereafter to close the switch, the said means including a stem assembly extending slidably through the top of the upper body part from the air chamber into the first named chamber.

5. A combined valve and switch as per claim 4, including single means extending adjustably through the top of the upper body part for guiding the stem and adjusting the tension of the spring means.

6. A combined valve and switch as per claim 3, in which the electric switch includes a contact member rigidly fastened to the upper end of the said stem, and a second contact member disposed above the aforesaid contact member and yieldably supported by the cap with freedom for limited vertical movement, the upper body part and the said spring-resisted means having interengageable portions disposed for limiting the upward movement of the said stem.

7. A control device of the class described comprising a valve body through which liquid flows, a valve member movable with respect to the valve body and having a closure portion and a metering portion consecutively disposed within the path of the liquid, means responsive to the pressure of the liquid for moving the valve member in a direction in which the said closure portion member first moves out of its closure position, and in which the metering portion first progressively increases the rate of liquid flow past the valve member and thereafter progressively decreases the said rate of flow; an electric switch including two relatively movable contact members, means connecting one of the contact members with the valve member, and yielding means continuously urging the valve member in the opposite direction, the connecting means being arranged for holding the said contacts in relative engagement throughout the said progressive decrease in the rate of liquid flow.

8. A combined fluid valve and electric switch comprising a casing having a chamber therein, a diaphragm extending horizontally across the chamber, the casing having an inlet passage leading to the chamber below the diaphragm and an outlet passage leading from the chamber below the diaphragm, an upright valve plunger controlling the connection of the chamber to the outlet passage, a first circuit terminal supported by the casing above the diaphragm, a second circuit terminal adapted to be moved vertically into and out of engagement with the first terminal, connecting means operatively connecting the diaphragm with the plunger and the second valve whereby an upward flexing of the diaphragm by the pressure of fluid in the said chamber will lift the said second terminal and plunger, and spring means continually resisting such upward flexing of the diaphragm; the connecting means including two presser members respectively engaging the upper and lower faces of the diaphragm, a lower stem fast with respect to both presser members and the valve plunger, and an upper stem fastened to the upper presser member and supporting the said second terminal, each of the stems being independently adjustable with respect to one of the presser members.

9. A combined fluid valve and electric switch as per claim 8, in which the casing has a portion thereof disposed for engagement by the lower presser member when the diaphragm is not flexed upwardly to limit the downward movement of the plunger, the said casing portion being formed for affording a sealing engagement with the lower presser member.

10. A device for conjointly controlling an electric circuit and the flow of a fluid, comprising an electric switch including two relatively movable members, a fluid valve including a movable closure member, connecting means rigidly connecting one switch member with the said closure member and movable in one direction for causing the switch members to contact and for moving the closure member out of its valve-closing position; means responsive to the presser of the fluid for moving the connecting means in the said direction, and spring means continually urging the connecting means in the opposite direction; the connecting means including portions which are separately adjustable to vary the spacing of the pressure-responsive means respectively from the closure member and from the said one switch member.

11. A device for conjointly controlling an electric circuit and the flow of liquid, as per claim 10, including a casing housing the recited elements, and the casing including two end portions which are detachable for affording access respectively to the said separately adjustable portions of the connecting means.

12. A device for conjointly controlling an electric circuit and the flow of a fluid, comprising an electric switch including two relatively movable members, a fluid valve including a movable closure member, connecting means rigidly connecting one switch member with the said closure member and movable in one direction for causing the switch members to contact and for moving the closure member out of its valve-closing position; means responsive to the pressure of the fluid for moving the connecting means in the said direction, and spring means continually urging the connecting means in the opposite direction; the two switch members and the valve being all in axial alinement, one of the switch members being yieldingly mounted to permit a further movement of the connecting means in the first named direction after the contacting of the switch members.

LEE B. GREEN.